(12) United States Patent
Cui et al.

(10) Patent No.: US 9,398,518 B2
(45) Date of Patent: Jul. 19, 2016

(54) CELL BROADCAST FOR SIGNALING RESOURCE LOAD FROM RADIO ACCESS NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/520,020

(22) Filed: Oct. 21, 2014

(65) Prior Publication Data

US 2016/0112931 A1    Apr. 21, 2016

(51) Int. Cl.
*H04W 48/18*    (2009.01)
*H04W 48/10*    (2009.01)
*H04W 28/02*    (2009.01)
*H04W 48/20*    (2009.01)

(52) U.S. Cl.
CPC .......... *H04W 48/10* (2013.01); *H04W 28/0289* (2013.01); *H04W 48/20* (2013.01)

(58) Field of Classification Search
CPC ..... H04W 36/08; H04W 36/10; H04W 36/16; H04W 36/165; H04W 36/18; H04W 36/22; H04W 28/08; H04W 28/10; H04W 48/16; H04W 48/18; H04W 48/20
USPC .......................... 455/434, 436, 438, 443, 453
See application file for complete search history.

(56) References Cited

U.S. PATENT DOCUMENTS

| | | |
|---|---|---|
| 5,953,677 A | 9/1999 | Sato |
| 6,314,308 B1 | 11/2001 | Sheynblat et al. |
| 6,430,168 B1 | 8/2002 | Djurkovic et al. |
| 6,628,946 B1 | 9/2003 | Wiberg et al. |
| 7,082,305 B2 | 7/2006 | Willars et al. |
| 7,116,970 B2 | 10/2006 | Brusilovsky et al. |
| 7,146,130 B2 | 12/2006 | Hsu et al. |
| 7,299,019 B1 | 11/2007 | Austin et al. |

(Continued)

FOREIGN PATENT DOCUMENTS

| | | |
|---|---|---|
| AU | 2005320356 | 12/2005 |
| EP | 2244503 | 10/2010 |

(Continued)

OTHER PUBLICATIONS

Feng, S. et al., "Self-Organizing Networks (SON) in 3GPP Long Term Evolution," Novel Mobile Radio Research, May 20, 2008.

(Continued)

*Primary Examiner* — Siu Lee
(74) *Attorney, Agent, or Firm* — Hartman & Citrin LLC

(57) ABSTRACT

Concepts and technologies are described herein for cell broadcast for signaling resource load from one or more radio access networks ("RANs"). According to one aspect disclosed herein, a base station can collect signaling load information of the base station. The base station can also generate a cell broadcast message that includes the signaling load information. The base station can also send the cell broadcast message to a target mobile device. The target mobile device can be configured to determine, based at least in part upon the signaling load information, to which radio access network of a plurality of radio access networks to connect.

20 Claims, 9 Drawing Sheets

(56) References Cited

U.S. PATENT DOCUMENTS

| | | |
|---|---|---|
| 7,400,600 B2 | 7/2008 | Mullany et al. |
| 7,400,886 B2 | 7/2008 | Sahim et al. |
| 7,440,755 B2 | 10/2008 | Balachandran |
| 7,496,060 B2 | 2/2009 | Ramirez et al. |
| 7,508,781 B2 | 3/2009 | Liu et al. |
| 7,590,422 B1 | 9/2009 | Chow et al. |
| 7,653,392 B2 | 1/2010 | Ovadia et al. |
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 7,983,713 B2 | 7/2011 | Sasse et al. |
| 8,045,980 B2 | 10/2011 | Buckley et al. |
| 8,068,843 B2 | 11/2011 | Yi et al. |
| 8,073,453 B2 | 12/2011 | Funnell |
| 8,121,090 B1 | 2/2012 | Dinan et al. |
| 8,121,607 B2 * | 2/2012 | Fang ............... H04W 36/22 370/331 |
| 8,126,461 B2 | 2/2012 | Sengupta et al. |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,305,970 B2 | 11/2012 | Park et al. |
| 8,325,661 B2 | 12/2012 | Montojo et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,141 B2 | 3/2013 | Rune et al. |
| 8,391,238 B2 | 3/2013 | Rune et al. |
| 8,396,480 B2 | 3/2013 | Prytz et al. |
| 8,417,823 B2 | 4/2013 | Luna et al. |
| 8,467,786 B2 | 6/2013 | Salkintzis |
| 8,488,586 B2 | 7/2013 | Centonza et al. |
| 8,493,935 B2 | 7/2013 | Zisimopoulos |
| 8,510,801 B2 | 8/2013 | Majmundar et al. |
| 8,522,312 B2 | 8/2013 | Huber et al. |
| 8,649,291 B2 | 2/2014 | Wang et al. |
| 8,675,583 B2 | 3/2014 | Lee et al. |
| 8,885,613 B2 | 11/2014 | Sachs et al. |
| 2002/0123365 A1 | 9/2002 | Thorson et al. |
| 2003/0078075 A1 | 4/2003 | Mcnicol |
| 2003/0117953 A1 | 6/2003 | Kinahan et al. |
| 2004/0165538 A1 | 8/2004 | Swami |
| 2005/0227696 A1 | 10/2005 | Kaplan et al. |
| 2006/0128394 A1 | 6/2006 | Turina et al. |
| 2006/0166677 A1 | 7/2006 | Derakshan et al. |
| 2006/0199608 A1 | 9/2006 | Dunn et al. |
| 2007/0091847 A1 | 4/2007 | Lee |
| 2007/0140163 A1 | 6/2007 | Meier et al. |
| 2007/0184835 A1 | 8/2007 | Bitran et al. |
| 2007/0253355 A1 * | 11/2007 | Hande ............... H04W 16/06 370/328 |
| 2007/0286092 A1 | 12/2007 | Famolari et al. |
| 2008/0144577 A1 | 6/2008 | Huang et al. |
| 2008/0200146 A1 | 8/2008 | Wang et al. |
| 2009/0068970 A1 | 3/2009 | Ahmed et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0252059 A1 | 10/2009 | Vigue et al. |
| 2010/0048205 A1 | 2/2010 | Guilford et al. |
| 2010/0056153 A1 | 3/2010 | Attar et al. |
| 2010/0056181 A1 | 3/2010 | Rippon et al. |
| 2010/0110890 A1 | 5/2010 | Rainer et al. |
| 2010/0136978 A1 | 6/2010 | Cho et al. |
| 2010/0149971 A1 | 6/2010 | Noriega |
| 2010/0234021 A1 | 9/2010 | Ngai et al. |
| 2010/0234042 A1 | 9/2010 | Chan et al. |
| 2010/0255849 A1 | 10/2010 | Ore |
| 2010/0267384 A1 | 10/2010 | Dwyer et al. |
| 2010/0279601 A1 | 11/2010 | Phan et al. |
| 2010/0296415 A1 | 11/2010 | Sachs et al. |
| 2010/0296474 A1 | 11/2010 | Noriega |
| 2010/0311435 A1 * | 12/2010 | Mueck ............... H04W 48/20 455/453 |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0128907 A1 | 6/2011 | Kvernvik |
| 2011/0142006 A1 | 6/2011 | Sachs |
| 2011/0149879 A1 | 6/2011 | Noriega et al. |
| 2011/0176424 A1 | 7/2011 | Yang et al. |
| 2011/0235615 A1 | 9/2011 | Kalhan |
| 2011/0261695 A1 | 10/2011 | Zhao et al. |
| 2011/0263260 A1 | 10/2011 | Yavuz et al. |
| 2011/0306386 A1 | 12/2011 | Centoza et al. |
| 2012/0013504 A1 | 1/2012 | Raento et al. |
| 2012/0021725 A1 | 1/2012 | Rune |
| 2012/0057503 A1 | 3/2012 | Ding et al. |
| 2012/0108252 A1 | 5/2012 | Dimou et al. |
| 2012/0142352 A1 | 6/2012 | Zhang et al. |
| 2012/0166604 A1 | 6/2012 | Fortier et al. |
| 2012/0195290 A1 | 8/2012 | Bienas |
| 2012/0214525 A1 | 8/2012 | Fujii et al. |
| 2012/0236717 A1 * | 9/2012 | Saska ............... H04W 48/02 370/235 |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0005344 A1 | 1/2013 | Dimou et al. |
| 2013/0012182 A1 | 1/2013 | Liao |
| 2013/0021929 A1 | 1/2013 | Kim |
| 2013/0021962 A1 | 1/2013 | Hu et al. |
| 2013/0023302 A1 | 1/2013 | Sivanesan et al. |
| 2013/0028081 A1 | 1/2013 | Yang et al. |
| 2013/0028184 A1 | 1/2013 | Lee et al. |
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0053038 A1 | 2/2013 | Lee et al. |
| 2013/0065562 A1 | 3/2013 | Singh |
| 2013/0065585 A1 | 3/2013 | Pelletier et al. |
| 2013/0065589 A1 | 3/2013 | Lee et al. |
| 2013/0111038 A1 | 5/2013 | Girard |
| 2013/0121145 A1 | 5/2013 | Draznin et al. |
| 2013/0121322 A1 | 5/2013 | Salkintzis |
| 2013/0143526 A1 | 6/2013 | Kanugovi et al. |
| 2013/0143542 A1 | 6/2013 | Kovvali et al. |
| 2013/0155849 A1 | 6/2013 | Koodli et al. |
| 2013/0165131 A1 | 6/2013 | Garcia Martin et al. |
| 2013/0170351 A1 | 7/2013 | Reznik et al. |
| 2013/0176988 A1 | 7/2013 | Wang et al. |
| 2013/0183976 A1 * | 7/2013 | Zhuang ............... H04W 48/20 455/436 |
| 2013/0188499 A1 | 7/2013 | Mach et al. |
| 2013/0189996 A1 | 7/2013 | Sridhar et al. |
| 2013/0208696 A1 | 8/2013 | Garcia Martin et al. |
| 2013/0210434 A1 | 8/2013 | Dimou et al. |
| 2013/0230011 A1 | 9/2013 | Rinne et al. |
| 2013/0308445 A1 | 11/2013 | Xiang et al. |
| 2013/0322238 A1 | 12/2013 | Sirotkin |
| 2014/0029420 A1 | 1/2014 | Jeong et al. |
| 2014/0092306 A1 | 4/2014 | Lee et al. |
| 2014/0092734 A1 | 4/2014 | Ljung |
| 2014/0099945 A1 | 4/2014 | Singh et al. |
| 2014/0128074 A1 * | 5/2014 | Vangala ............... H04W 36/22 455/436 |
| 2014/0141785 A1 | 5/2014 | Wang et al. |
| 2014/0161256 A1 * | 6/2014 | Bari ............... H04W 12/06 380/247 |
| 2014/0162626 A1 * | 6/2014 | Cui ............... H04W 48/12 455/422.1 |
| 2014/0204745 A1 | 7/2014 | Nuss |
| 2014/0247810 A1 | 9/2014 | Bontu et al. |

(56) References Cited

U.S. PATENT DOCUMENTS

| | | | |
|---|---|---|---|
| 2014/0274066 A1 | 9/2014 | Fodor et al. | |
| 2014/0335870 A1 | 11/2014 | Yilmaz et al. | |
| 2015/0208280 A1* | 7/2015 | Lorca Hernando | ... H04W 16/08 370/235 |
| 2015/0244520 A1* | 8/2015 | Kariman | ............... H04L 9/0863 713/168 |

FOREIGN PATENT DOCUMENTS

| | | |
|---|---|---|
| EP | 2197228 | 12/2011 |
| EP | 2533571 | 12/2012 |
| EP | 2632072 | 8/2013 |
| EP | 2603046 | 12/2013 |
| WO | WO 2010/130134 | 11/2010 |
| WO | WO 2011/053204 | 5/2011 |
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/ Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/ Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996): 82-90. http://inrg.csie.ntu.edu.tw/course/wms/paper/Pollin96.pdf.
Office Action mailed Mar. 12, 2014 in U.S. Appl. No. 13/707,551.
U.S. Appl. No. 13/707,531, filed Dec. 6, 2012.
U.S. Appl. No. 13/707,551, filed Dec. 6, 2012.
U.S. Appl. No. 13/707,534, filed Dec. 6, 2012.
U.S. Appl. No. 13/707,535, filed Dec. 6, 2012.
U.S. Appl. No. 13/707,538, filed Dec. 6, 2012.
U.S. Appl. No. 13/707,539, filed Dec. 6, 2012.
U.S. Appl. No. 14/064,329, filed Oct. 28, 2013.
U.S. Appl. No. 14/035,584, filed Sep. 24, 2013.
U.S. Appl. No. 14/059,401, filed Oct. 21, 2013.
U.S. Appl. No. 14/084,578, filed Nov. 19, 2013.
U.S. Office Action dated Mar. 4, 2015 in U.S. Appl. No. 13/707,534.
U.S. Office Action dated Mar. 24, 2015 in U.S. Appl. No. 13/707,551.
U.S. Office Action dated Feb. 19, 2015 in U.S. Appl. No. 14/084,578.
U.S. Office Action dated May 12, 2015 in U.S. Appl. No. 13/707,535.
U.S. Office Action dated May 11, 2015 in U.S. Appl. No. 14/064,329.
U.S. Office Action dated May 19, 2015 in U.S. Appl. No. 14/035,584.
U.S. Office Action dated Jul. 20, 2015 in U.S. Appl. No. 13/707,534.
U.S. Office Action dated Jul. 9, 2015 in U.S. Appl. No. 13/707,531.
U.S. Office Action dated Jul. 1, 2015 in U.S. Appl. No. 13/707,538.
U.S. Office Action dated Jun. 17, 2015 in U.S. Appl. No. 14/084,578.
Raza, Syed Numan, "LTE Performance Study," Master of Science Thesis, Feb. 9, 2012.
Jin et al., "SoftCell: Taking Control of Cellular Core Networks," May 15, 2013, Princeton University, Bell Labs.
Bernardos, Carlos J., "Final architecture design," Seventh Framework Programme, 2012, Medieval.
Stavroulaki et al., "Cognitive Control Channels: From Concept to Identification of Implementation Options," IEEE Communications Magazine, Jul. 2012, pp. 96-108, IEEE.
U.S. Office Action dated Nov. 17, 2014 in U.S. Appl. No. 13/707,535.
U.S. Office Action dated Dec. 24, 2014 in U.S. Appl. No. 13/707,531.
U.S. Office Action dated Dec. 10, 2014 in U.S. Appl. No. 13/707,551.
U.S. Office Action dated Dec. 24, 2014 U.S. Appl. No. 13/707,538.
U.S. Office Action dated Jan. 22, 2015 in U.S. Appl. No. 13/707,539.
U.S. Office Action dated Jan. 22, 2015 in U.S. Appl. No. 14/059,041.
U.S. Office Action dated Sep. 17, 2015 in U.S. Appl. No. 13/707,539.
U.S. Office Action dated Sep. 30, 2015 in U.S. Appl. No. 13/707,551.
U.S. Office Action dated Nov. 16, 2015 in U.S. Appl. No. 13/707,534.
U.S. Office Action dated Sep. 30, 2015 in U.S. Appl. No. 13/707,535.
U.S. Office Action dated Nov. 16, 2015 in U.S. Appl. No. 13/707,531.
U.S. Notice of Allowance dated Nov. 13, 2015 in U.S. Appl. No. 13/707,538.

(56) References Cited

OTHER PUBLICATIONS

U.S. Notice of Allowance dated Dec. 14, 2015 in U.S. Appl. No. 14/035,584.

U.S. Office Action dated Feb. 25, 2016 in U.S. Appl. No. 13/707,535.
U.S. Office Action dated Apr. 14, 2016 in U.S. Appl. No. 13/707,551.

* cited by examiner

CELL BROADCAST FOR SIGNALING RESOURCE LOAD FROM RADIO ACCESS NETWORKS

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for cell broadcast for signaling resource load from one or more radio access networks ("RANs"). According to one aspect disclosed herein, a base station can collect signaling load information of the base station. The base station can generate a cell broadcast message that includes the signaling load information. The base station can send the cell broadcast message to a target mobile device. The target mobile device can determine, based at least in part upon the signaling load information, to which RAN of a plurality of RANs to connect.

In some embodiments, the cell broadcast message is or includes a system information block ("SIB"). In some other embodiments, the cell broadcast message is or includes a short messaging service ("SMS") message. In some embodiments, the cell broadcast message can include a priority order in which the mobile device should select the plurality of RANs.

In some embodiments, the base station can learn signaling load information of one or more overlapping cells associated with a different radio access technology ("RAT") from a RAT utilized by the base station. In these embodiments, the base station can generate the cell broadcast message further including the signaling load information of the overlapping cell(s).

In some embodiments, the base station can learn signaling load information of one or more overlapping cells associated with a different frequency from a frequency utilized by the base station. In these embodiments, the base station can generate the cell broadcast message further including the signaling load information of the overlapping cell(s).

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
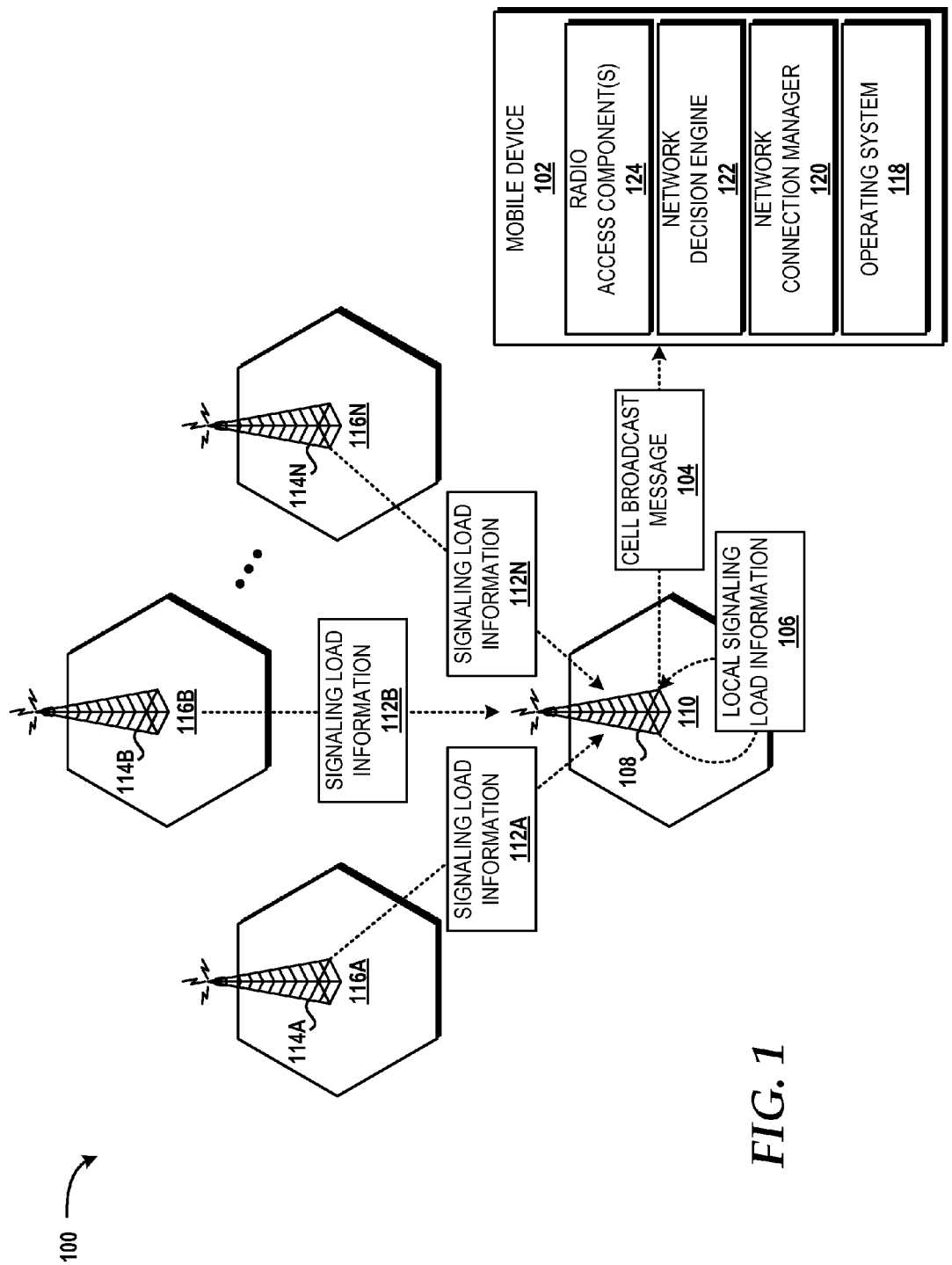
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across radio access technologies and radio frequencies utilizing cell broadcast messages will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102 that is configured to connect to and communicate with one or more radio access networks ("RANs") for voice and/or data communications between the mobile device 102 and one or more other mobile devices, computers, servers, networking devices, and/or other networks (not shown). The mobile device 102 is also configured to receive a cell broadcast message 104 from one or more RANs. The cell broadcast message 104 can include information regarding network signaling load conditions of one or more RANs to which the mobile device 102 is capable of connecting. The mobile device 102 can select one or more RANs to connect to, based at least in part upon the signaling load information included in the cell broadcast message 104.

In the illustrated example, the mobile device 102 receives the cell broadcast message 104 including local signaling load information 106 collected by a base station 108 that is operating within a cell 110 of a RAN. As used herein, a "signaling load" refers to a load created by one or more signaling operations between one or more of RANs and the mobile device 102 via one or more signaling bearers. Moreover, a "singling load" specifically excludes any traffic load associated with one or more traffic bearers. For example, an LTE RAN base station can monitor and report the utilization of physical uplink and downlink control channels ("PUCCH" and "PDCCH") according to the percentage of time these resources are idle and available over a specified time interval.

As used herein, a "cell" refers to a geographical area that is served by one or more base stations operating within a RAN. As used herein, a "base station" refers to a radio receiver and/or transmitter (collectively, transceiver) that is/are configured to provide a radio/air interface by which one or more mobile devices, such as the mobile device 102, can connect to a network. Accordingly, a base station is intended to encompass one or more base transceiver stations ("BTSs"), one or more Node Bs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to/from a network.

The cell broadcast message 104 can additionally or alternatively include at least a portion of signaling load information 112A-112N (hereinafter, at times, referred to collectively or generically as "signaling load information 112") collected by one or more other base stations 114A-114N (hereinafter, at times, referred to collectively or generically as "other base stations 114") that operate in corresponding cells 116A-116N (hereinafter, at times, referred to collectively or generically as "other cells 116") of the same RAN as the cell 110 or one or more other RANs. In some instances, the base station 108 operates utilizing a first frequency of a radio access technology ("RAT"), while one or more of the other base stations 114 operate utilizing a second frequency of the same RAT. As used herein, a RAT can refer to any mobile telecommunications standard or draft standard thereof, or any other technology by which a mobile device, such as the mobile device 102, can wirelessly access a RAN.

The mobile device 102 may be a cellular phone, a feature phone, a smartphone, a mobile computing device, a tablet computing device, a portable television, a portable video game console, or any other computing device that is configured to connect to and communicate with one or more RANs via one or more radio access components. In some embodiments, the mobile device 102 includes an integrated or external radio access component that facilitates wireless communication with one or more RANs. The radio access component may be a cellular telephone that is in wired or wireless communication with the mobile device 102 to facilitate a tethered data connection to one or more RANs. Alternatively, the access component includes a wireless transceiver configured to send data to and receive data from one or more RANs and a universal serial bus ("USB") or another communication interface for connection to the mobile device 102 so as to enable tethering. In any case, the mobile device 102 can wirelessly communicate with one or more RANs over a radio/air interface in accordance with one or more RATs. The mobile device 102 may also initiate, receive, and/or maintain voice calls with one or more other voice-enabled telecommunications devices such as other mobile devices or landline devices (not shown). The mobile device 102 may also exchange Short Message Service ("SMS") messages, Multimedia Message Service ("MMS") messages, email, and/or other messages with other devices (not shown).

The cell broadcast message 104 can include any message that is capable of being sent to the mobile device 102 from a base station over a radio/air interface. The cell broadcast message 104 can be sent to the mobile device 102 using any physical, transport, and/or logical channels. These channel types are generally known and therefore are not described in greater detail herein.

In some embodiments, the cell broadcast message 104 is or includes a System Information Block ("SIB"). In some other embodiments, the cell broadcast message 104 is included in a SIB that contains other information. The SIB may be a new SIB configured to include signaling load information such as the local signaling load information 106 and/or the signaling load information 112. Alternatively, the SIB may be an existing SIB that has been modified to include signaling load information.

In some embodiments, the cell broadcast message 104 is an SMS message. In these embodiments, the base station 108 can send the cell broadcast message 104 to the mobile device 102, and potentially to one or more other mobile devices that are connected to the base station 108 or otherwise operating within the cell 110, via SMS Cell Broadcast ("SMS-CB"). Alternatively, in these embodiments, the base station 108 can send the cell broadcast message 104 to the mobile device 102 via SMS Peer-to-Peer ("SMPP"). The cell broadcast message 104 may be sent to the mobile device 102 via other messaging services including, but not limited to, MMS, Wireless Application Protocol ("WAP") push message, Unstructured Supplementary Service Data ("USSD"), or any combination thereof. It should be understood that network elements, such as Short Message Service Centers ("SMSCs"), Multimedia Message Service Centers ("MMSCs"), WAP servers, USSD servers, and the like, that support the aforementioned messaging services are not illustrated merely for ease of description, however, these and/or other network elements can be utilized to support the aforementioned delivery methods of the cell broadcast message 104.

In the illustrated example, the mobile device 102 receives the cell broadcast message 104 from the base station 108. Alternatively or additionally, the mobile device 102 can receive one or more cell broadcast messages from any number of base stations such as one or more of the other base stations 114. Also in the illustrated example, the cell broadcast message 104 includes the local signaling load information 106 and the signaling load information 112. It is contemplated, however, that the cell broadcast message 104 may include only the local signaling load information 106, only the signaling load information 112A, only the signaling load information 112B, only the signaling load information 112N, or any combination thereof.

The mobile device 102 includes an operating system 118, a network connection manager 120, a network decision engine 122, and one or more radio access components 124. The operating system 118 is a program for controlling the operation of the mobile device 102. The operating system 118 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The network connection manager 120 can be configured to manage all or a portion of the network connections available to the mobile device 102 at a given time, including, for example, connections established via one or more radios of the mobile device 102 such as one or more of the radio access components 124. In some embodiments, the network connection manager 120 is included as part of the operating system 118 and/or another application stored on the mobile device 102 such as the network decision engine 122.

The network decision engine 122 utilizes network signaling load information included in cell broadcast messages, such as the cell broadcast message 104, to determine to which network the mobile device 102 should connect. In some embodiments, the network decision engine 122 is an application program that includes computer-executable instructions that, when executed by one or more processors of the mobile device 102, cause the mobile device 102 to analyze the network signaling load information included in one or more cell broadcast messages to select one or more RANs and instruct the mobile device 102, and more particularly, the network connection manager 120, to connect to the selected RAN(s).

In some embodiments, the local signaling load information 106 and/or the signaling load information 112 includes historic network signaling load information. As used herein, "historic network signaling load information" can include signaling load information obtained based upon network signaling load experienced by the base station 108 and/or one or more of the other base stations 114 in the past or otherwise in non-real-time. In some embodiments, historic network signaling load information is utilized by the mobile device 102 to identify one or more network signaling load trends over a specified period of time. This trending network signaling load information can be useful to the mobile device 102 to predict times during which network signaling load is favorable or not to support communications between the mobile device 102 and one or more RANs.

In some other embodiments, the local signaling load information 106 and/or the signaling load information 112 includes current network signaling load information. As used herein, "current network signaling load data" can include network signaling load data that is obtained based upon a network signaling load experienced by the base station 108 and/or one or more of the other base stations 114 in real-time or near real-time. Real-time, in this context, is the actual time during which a network signaling load is experienced by the base station 108 and/or one or more of the other base stations 114. Near real-time, in this context, is the actual time during which a network signaling load is experienced by the base station 108 and/or one or more of the other base stations 114 plus a delay on the order of seconds, minutes, or any order of magnitude thereof, for example.

What constitutes near-real time network signaling load information versus historic network signaling load information can be defined by a service provider that provides service via the base station 108 and/or one or more of the other base stations 114. It should be understood that real-time network signaling load information associated with a real-time network signaling load of the base station 108 and/or one or more of the other base stations 114, and near real-time network signaling load information associated with a near real-time network signaling load of the base station 108 and/or one or more of the other base stations 114 might be received by the mobile device 102 with delay caused by latency and/or other network phenomena. Moreover, this delay may increase with the additional time needed to generate the cell broadcast message 104 including the local signaling load information 106 and/or the signaling load information 112, and to send the cell broadcast message 104 to the mobile device 102.

In some embodiments, the network decision engine 122 utilizes additional information to select one or more RANs. This information can include, but is not limited to, one or more policies and/or one or more user profiles. As used herein, the term "policy" refers to one or more settings, one or more configurations, one or more rules, and/or the like that define, at least in part, one or more courses or methods of action in light of one or more conditions to be used in a determination made by the mobile device 102 regarding to which RAN(s) the mobile device 102 should connect. In some embodiments, a policy includes one or more rules that specify one or more if-then conditions by which to handle a particular situation, such as redirecting network traffic based upon network signaling load experienced by the base station 108 and/or one or more of the other base stations 114 and that is reported to the mobile device 102 in the cell broadcast message 104. In some other embodiments, a policy includes one or more matrices of cause and effect conditions, tables of actions, and/or the like for responding to or otherwise dealing with certain stimuli, such as network conditions evidenced by the local signaling load information 106, the signaling load information 112, and/or other stimuli.

As used herein, the term "user profile" refers to a collection of data associated with a user that accesses one or more RANs via a device such as the mobile device 102. A user in this context refers to an individual or other entity. A user profile can define information regarding a service agreement between a user and one or more service providers that provide a service, at least in part, via one or more RANs. The service agreement may include terms of service for pre-paid and/or post-paid service. The service agreement may include terms of roaming agreements between two or more service providers such as mobile telecommunications carriers. The service agreement may define a service tier for the user. A service tier may establish a priority for a user in regard to utilizing network resources to connect to one or more RANs via the mobile device 102.

As used herein, a RAN may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAN can utilize various channel access methods (which may or may not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the mobile device 102. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

A RAN can be part of one or more mobile telecommunications networks. As used herein, a mobile telecommunications network includes one or more RANs and a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices, such as the radio access component(s) 124 of mobile device 102. Moreover, a mobile telecommunications network can provide a connection to an internet or other WAN so that the mobile device 102 can access internet content such as websites, streaming media, online video games, downloadable content, and the like.

As mentioned above, the cell 110 and the other cells 116 may be part of the same RAN or any number of different RANs. In some instances, the mobile device 102 is capable of simultaneous connection to the cell 110 in addition to one or more of the other cells 116. As such, in some embodiments, the mobile device 102 is a multimode device. The cell 110 and the other cells 116 can be any shape and can have any dimensions. Thus, the illustrated embodiment should be understood as being illustrative, and should not be construed as being limiting in any way.

It should be understood that some implementations of the operating environment 100 may include additional functionality or include less functionality than described above. Thus, the illustrated embodiment should be understood as being illustrative, and should not be construed as being limiting in any way.

Figure 2:
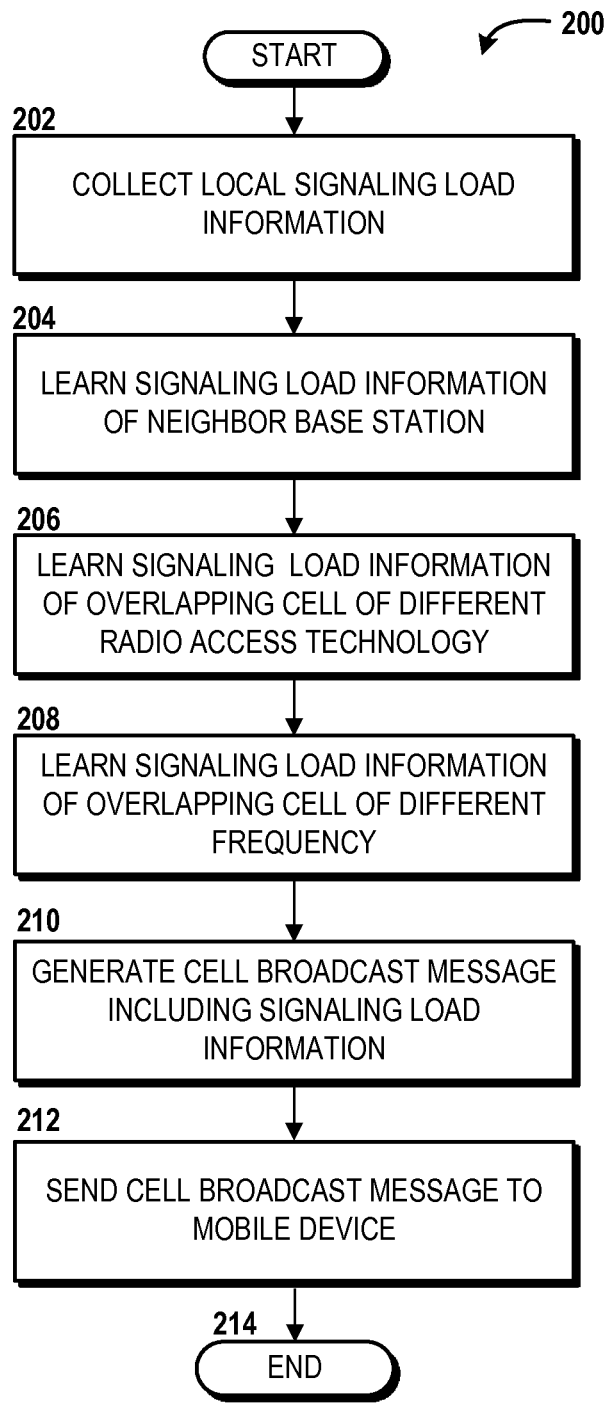
FIG. 2 is a flow diagram illustrating aspects of a method for generating a cell broadcast message that includes network signaling load information, according to an illustrative embodiment.

Turning now to FIG. 2, a flow diagram illustrating aspects of a method 200 for generating a cell broadcast message, such as the cell broadcast message 104, that includes network signaling load information will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 is described from the perspective of the base station 108. As such, the method 200 is described with additional reference to FIG. 1. The method 200 begins and proceeds to operation 202, where the base station 108 collects the local signaling load information 106. The local signaling load information 106 can include signaling utilization information associated with the utilization of signaling resources available to the base station 108. In some embodiments, the base station 108 collects signaling utilization information, and then calculates a composite signaling load level of the base station 108 for inclusion in the cell broadcast message 104. A composite signaling load level can be calculated utilizing any signaling load calculation method, which, for example, may be selected by or for a service provider operating the base station 108 based upon the needs of the service provider.

From operation 202, the method 200 proceeds to operation 204, where the base station 108 learns the signaling load information 112 from one or more neighbor base stations, which may include one or more of the other base stations 114, that operate within the same RAN. In some embodiments, the base station 108 learns the signaling load information 112 utilizing a self-organizing network or self-optimizing network feature such as provided by 3$^{rd}$ Generation Partnership Project ("3GPP") and/or New Generation Mobile Networks ("NGMN"). In particular, the base station 108 can utilize the Automatic Neighbor Relation ("ANR") detection feature of LTE to detect one or more of the other base stations 114 and collect the signaling load information 112 therefrom. Other mechanisms by which the base station 108 can learn signaling load information of one or more neighboring cells are contemplated.

From operation 204, the method 200 proceeds to operation 206, where the base station 108 learns the signaling load information 112 of one or more overlapping cells that may include one or more of the other cells 116 in which one or more of the other base stations 114 operate, and that utilize a different RAT than the RAT utilized by the base station 108. For example, the base station 108 and one or more of the other base stations 114 may operate in accordance with different RATs, and may also overlap in radio range such that the base station 108 is capable of receiving signals broadcast by one or more of the other base stations 114. In such a configuration, the base station 108 can learn the signaling load information 112 from the other base stations 114 and utilize the information to enhance the collective signaling load information provided to the mobile device 102 in the cell broadcast message 104.

From operation 206, the method 200 proceeds to operation 208, where the base station 108 learns the signaling load information 112 of one or more overlapping cells that may include one or more of the other cells 116 in which one or more of the other base stations 114 operate, and that utilize a different frequency than the frequency utilized by the base station 108. For example, the base station 108 and one or more of the other base stations 114 may operate in accordance with different radio frequencies, and may also overlap in radio range such that the base station 108 is capable of receiving signals broadcast by one or more of the other base stations 114. In such a configuration, the base station 108 can learn the signaling load information 112 from the other base stations 114 and utilize the signaling load information 112 to enhance the collective signaling load information provided to the mobile device 102 in the cell broadcast message 104.

From operation 208, the method 200 proceeds to operation 210, where the base station 108 generates the cell broadcast message 104 including at least a portion of the local signaling load information 106 and/or the signaling load information 112, collected at operations 202-208. From operation 210, the method 200 proceeds to operation 212, where the base station 108 sends the cell broadcast message 104 to one or more mobile devices, including the mobile device 102. From operation 212, the method 200 proceeds to operation 214, where the method 200 may end.

Although the method 200 is described as being performed for one base station, in some implementations, the method 200 is utilized by a plurality of base stations operating in the same RAN and/or across multiple RANs that may utilize the same or different RAT and/or the same or different radio frequency. Accordingly, in these implementations, mobile devices operating within various RANs can receive one or more cell broadcast messages that provide insight into the signaling load conditions of the various RANs to which the mobile devices are capable of connecting. For cases in which a single cell broadcast message is utilized, network signaling load information of one or more cells can be concatenated within the same message. The mobile devices can then utilize this information at least in part to select one or more of the RANs and connect to the selected RANs.

In some embodiments, signaling load information is sent in an order of priority based upon, for example, signaling load conditions and/or other factors, such as, but not limited to, RAT, frequency band, and carrier preferences. The priority order can convey to a mobile device the preference of RAT, frequency band, and/or cellular network the mobile device should select. If a single cell broadcast message is used, signaling load information can be concatenated and listed within the cell broadcast message in an order of priority.

Figure 3:
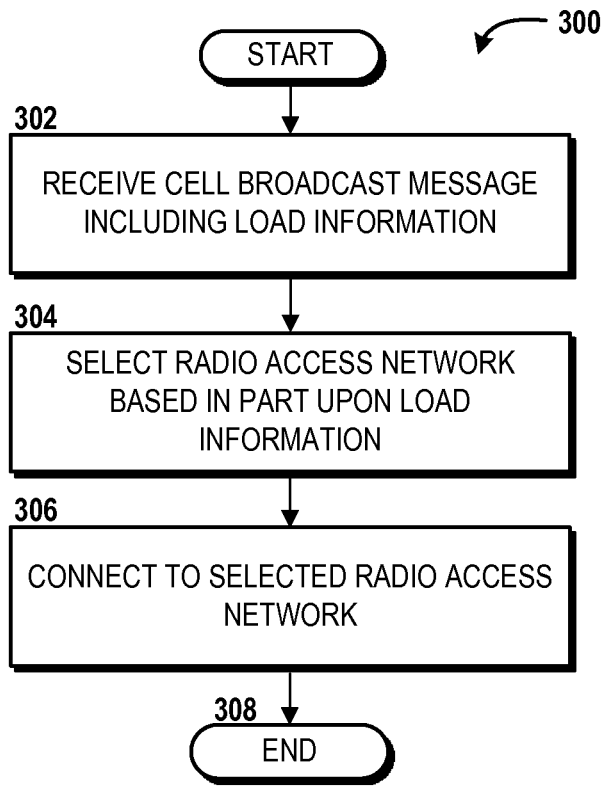
FIG. 3 is a flow diagram illustrating aspects of a method for utilizing network signaling load information received in a cell broadcast message to select a radio access network, according to an illustrative embodiment.

Turning now to FIG. 3, a flow diagram illustrating aspects of a method 300 for utilizing signaling load information received in a cell broadcast message, such as the cell broadcast message 104, to select a RAN will be described, according to an illustrative embodiment. The method 300 is described from the perspective of the mobile device 102. As such, the method 300 is described with additional reference to FIG. 1.

The method 300 begins and proceeds to operation 302, where the mobile device 102 receives the cell broadcast message 104 from the base station 108. The cell broadcast message 104 can include at least a portion of the local signaling load information 106 and/or the signaling load information 112 collected at operations 202-208 of the method 200, described above. From operation 302, the method 300 proceeds to operation 304, where the mobile device 102 executes the network decision engine 122 to select a RAN based in part upon the signaling load information included in the cell broadcast message 104. In some embodiments, the network decision engine 122 factors one or more policies and/or one or more user profiles for a user of the mobile device 102 in selecting one or more RANs. From operation 304, the method 300 proceeds to operation 306, wherein the mobile device 102 connects to the selected RAN. From operation 306, the method 300 proceeds to operation 308, wherein the method 300 may end.

In some embodiments, signaling load information is received by a mobile device in an order of priority based upon, for example, signaling load conditions and/or other factors, such as, but not limited to, RAT, frequency band, and carrier preferences. The mobile device can utilize the priority order to determine a preference of RAT, frequency band, and/or cellular network of a carrier providing service to the mobile device and based the selection of RAN at least in part upon this preference.

Figure 4:
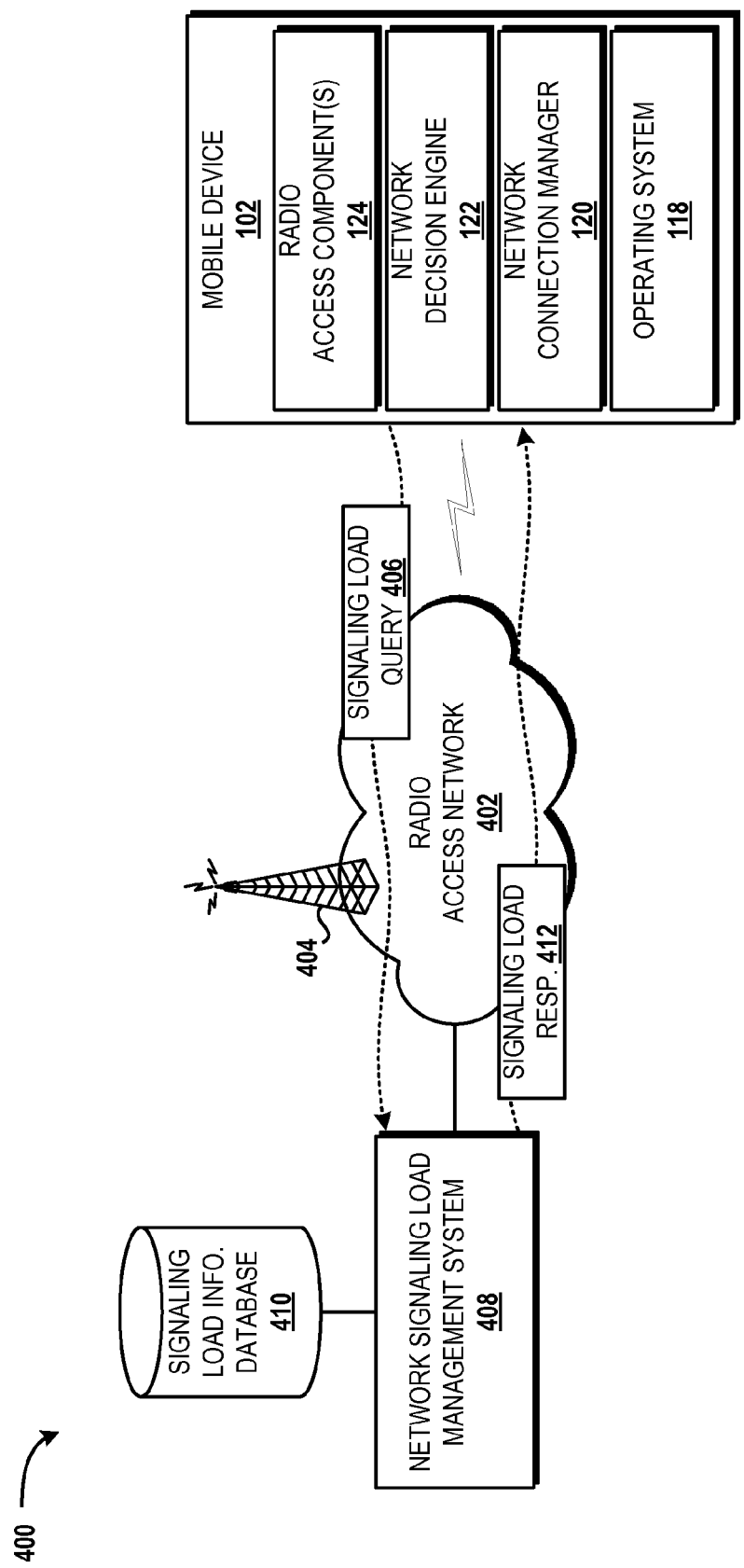
FIG. 4 is a block diagram illustrating aspects of another illustrative operating environment for various concepts disclosed herein.

Turning now to FIG. 4, aspects of an illustrative operating environment 400 for various concepts disclosed herein will be described. It should be understood that the operating environment 400 and the various components thereof have been greatly simplified for purposes of discussion. Accordingly, additional or alternative components of the operating environment 400 can be made available without departing from the embodiments described herein.

The operating environment 400 shown in FIG. 4 includes the mobile device 102, which is described above in greater detail with reference to FIG. 1. In the operating environment 400, the mobile device 102 is configured to connect to and communicate with a RAN 402. The RAN 402 can operate in accordance with any of the technologies described herein above. In the illustrated embodiment, the RAN 402 includes an SIB-incompatible base station 404. The SIB-incompatible base station 404 does not support SIBs that include signaling load information (hereinafter "signaling load-based SIB"). In such instances, the mobile device 102, and more particularly, the network decision engine 122, can generate a signaling load query 406 and send the signaling load query 406 to a network signaling load management system 408. In response, the network signaling load management system 408 can obtain the signaling load information requested in the signaling load query 406 from a signaling load information database 410 and provide the requested signaling load information to the mobile device 102 in a signaling load query response 412 ("signaling load response 412").

The network signaling load management system 408 receives signaling load information from the RAN 402 and stores the signaling load information in the signaling load information database 410. The signaling load information can include any of the various types of signaling load information described above. The network signaling load management system 408, in some embodiments, requests signaling load information from the RAN 402 and, more particularly, one or more network elements operating within the RAN 402 such as the SIB-incompatible base station 404. As such, the network signaling load management system 408 can be in a pull configuration with one or more network elements of the RAN 402. In some other embodiments, the network signaling load management system 408 receives the signaling load information pushed by one or more network elements of the RAN 402. Although the network signaling load management system 408 is illustrated as being external to the RAN 402, the network signaling load management system 408 can operate within the RAN 402 or elsewhere within a mobile telecommunications network that includes the RAN 402.

Although the network signaling load management system 408 is illustrated as being in communication with a single RAN, the network signaling load management system 408 may be in communication with any number of RANs to receive signaling load information therefrom. Moreover, the signaling load information received from the RAN 402 can include signaling load information for one or more other RANs that operate in accordance with other technologies and/or frequencies.

The mobile device 102 can generate the signaling load query 406 on a periodic basis, which may be pre-defined, for example, by a service provider operating the RAN 402 and provided to the mobile device 102. In some embodiments, the signaling load query 406 is sent more or less frequently based upon the performance characteristics of the current served technology provided via the RAN 402, the performance of the service provider that operates the RAN 402, and/or the performance of one or more layers of a mobile telecommunications network that includes the RAN 402.

In some embodiments, the mobile device 102 generates the signaling load query 406 including the served physical cell ID ("PCI") for the cell to which the mobile device 102 is connected, and/or the cell ID in the signaling load query 406. In these embodiments, the network signaling load management system 408 can send the corresponding signaling load information to the mobile device 102 and one or more neighboring cells. In this manner, load balancing works in the presence or absence of radio technologies/base stations with signaling load-based SIB support.

Figure 5:
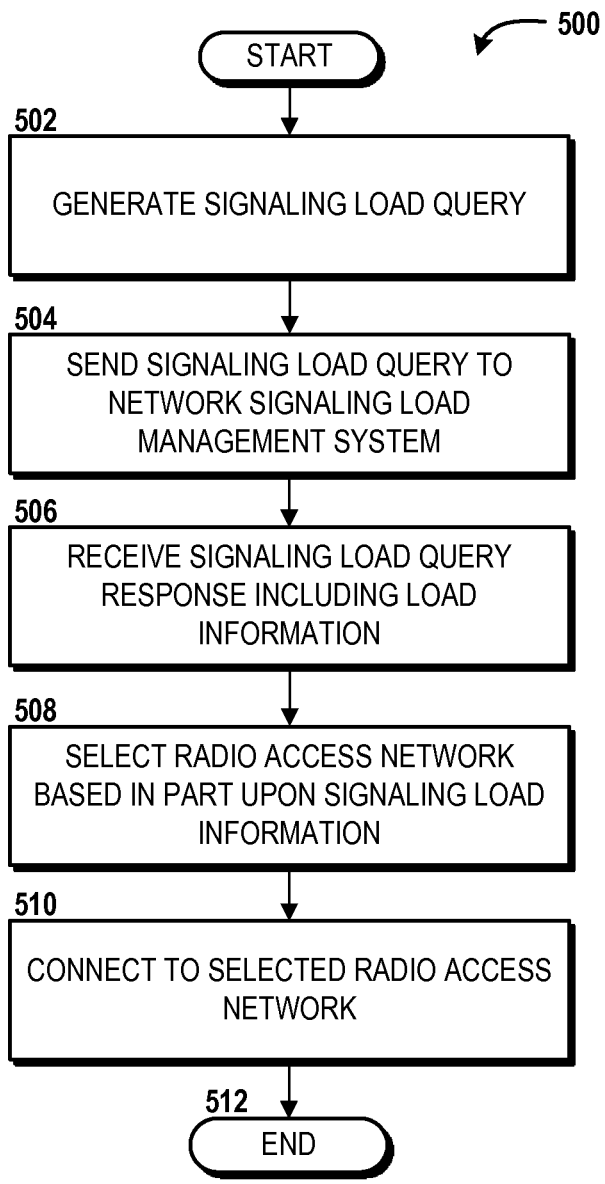
FIG. 5 is a flow diagram illustrating aspects of a method for generating a signaling load query, according to an illustrative embodiment.

Turning now to FIG. 5, a flow diagram illustrating aspects of a method 500 for generating a signaling load query, such as the signaling load query 406, will be described, according to an illustrative embodiment. The method 500 is described with additional reference to FIG. 4. The method 500 is described from the perspective of the mobile device 102.

The method 500 begins and proceeds to operation 502, where the mobile device 102 generates the signaling load query 406. From operation 502, the method 500 proceeds to operation 504, where the mobile device 102 sends the signaling load query 406 to the network signaling load management system 408. From operation 504, the method 500 proceeds to operation 506, where the mobile device 102 receives the signaling load response 412 from the network signaling load management system 408. From operation 506, the method 500 proceeds to operation 508, where the mobile device 102 selects a RAN based in part upon the signaling load information included in the signaling load query response 412. From operation 508, the method 500 proceeds to operation 510, where the mobile device 102 connects to the selected RAN. From operation 510, the method 500 proceeds to operation 512, wherein the method 500 may end.

Figure 6:
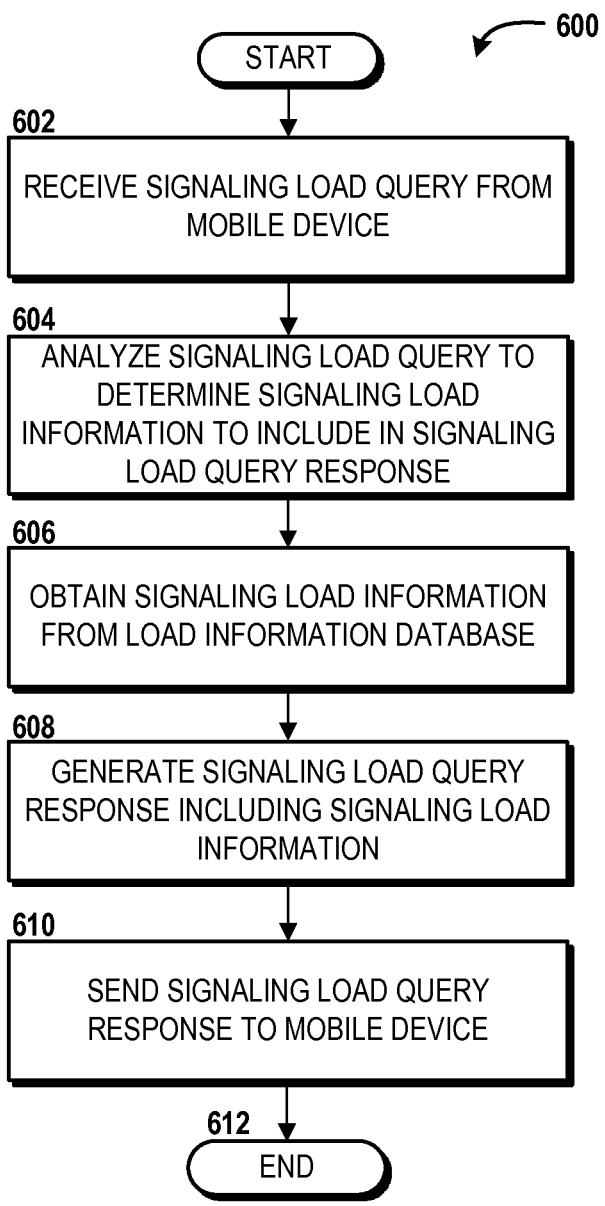
FIG. 6 is a flow diagram illustrating aspects of a method for generating a signaling load query response, according to an illustrative embodiment.

Turning now to FIG. 6, a flow diagram illustrating aspects of a method 600 for generating a signaling load query response, such as the signaling load query response 412, will be described, according to an illustrative embodiment. The method 600 is described with additional reference to FIG. 4. The method 600 also is described from the perspective of the network signaling load management system 408.

The method 600 begins and proceeds to operation 602, where the network signaling load management system 408 receives the signaling load query 406 from the mobile device 102. From operation 602, the method 600 proceeds to operation 604, where the network signaling load management system 408 analyzes the signaling load query 406 to determine signaling load information to include in the signaling load response 412. From operation 604, the method 600 proceeds to operation 606, where the network signaling load management system 408 obtains the requested signaling load information from the signaling load information database 410.

From operation 606, the method 600 proceeds to operation 608, where the network signaling load management system 408 generates the signaling load response 412 that includes the signaling load information obtained from the signaling load information database 410 at operation 606. From operation 608, the method 600 proceeds to operation 610, where the network signaling load management system 408 sends the signaling load response 412 to the mobile device 102. From operation 610, the method 600 proceeds to operation 612, where the method 600 may end.

Figure 7:
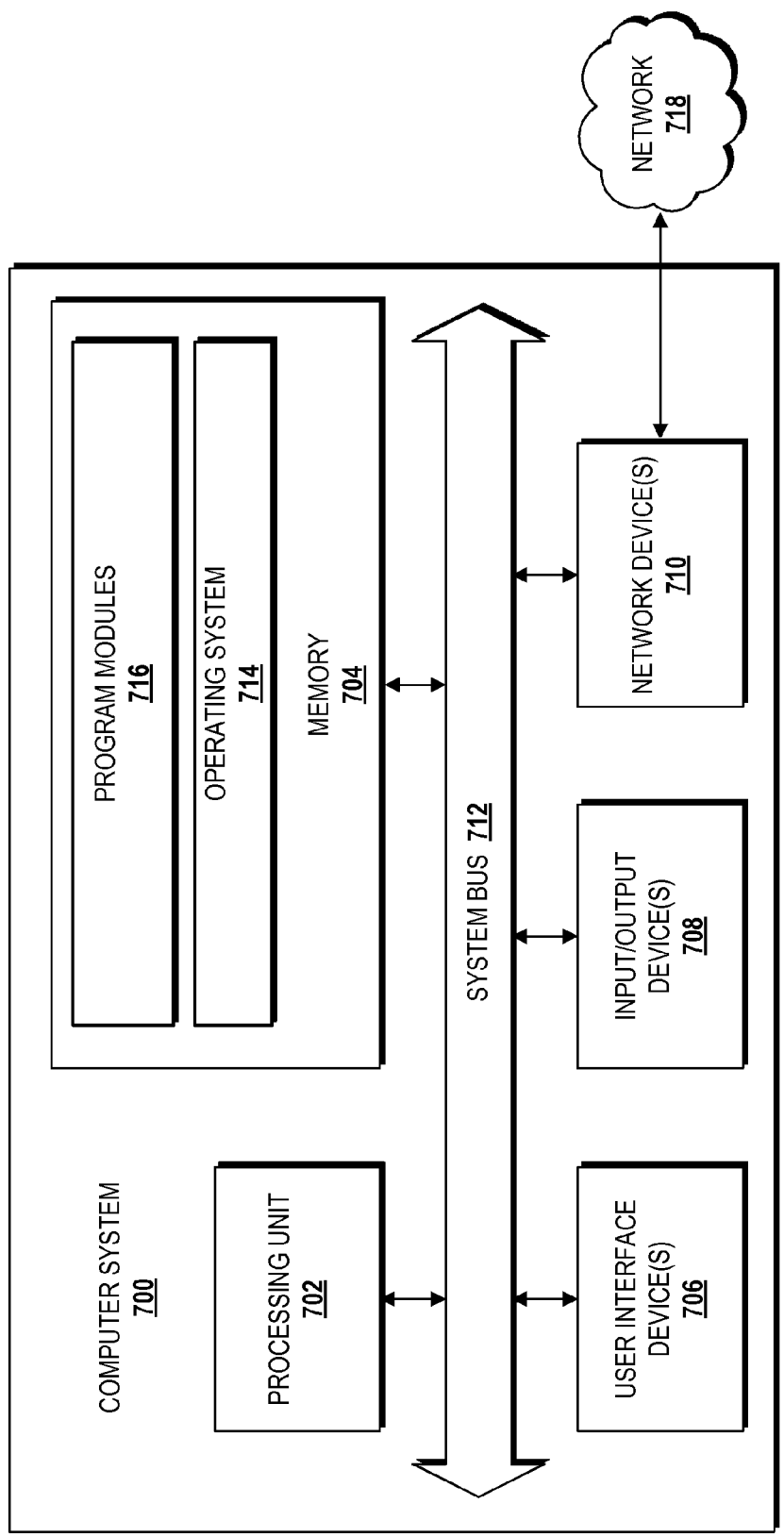
FIG. 7 is a block diagram illustrating an example computer system capable of implementing aspects of the embodiments presented herein.

FIG. 7 is a block diagram illustrating a computer system 700 configured to provide the functionality in accordance with various embodiments of the concepts and technologies disclosed herein. In some implementations, the mobile device 102, the network signaling load management system 408, the base station 108, the other base stations 114A-114N, and/or the SIB-incompatible base station 404 can utilize an architecture that is the same as or similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 can include the network connection manager 120 and/or the network decision engine 122 in embodiments that the mobile device 102 is configured like the computer system 700. The program modules 716 and/or other programs can be embodied in computer-readable media containing instructions that, when executed by the processing unit 702, perform one or more of the methods 200, 300, 500, 600 or at least a portion thereof, described in detail above with respect to FIGS. 2, 3, 5, and 6. According to embodiments, the program modules 716 may be embodied in hardware, software, firmware, or any combination thereof. Although not shown in FIG. 7, it should be understood that the memory 704 also can be configured to store the cell broadcast message 104, the local signaling load information 106, the signaling load information 112, the signaling load information database 410, the signaling load query 406, the signaling load response 412, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718, such as the RAN 402. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 718 may be a wired network such as, but not limited to, a wide area network ("WAN"), a wired LAN such as provided via Ethernet, a wired personal area network n ("PAN"), or a wired metropolitan area network ("MAN").

Figure 8:
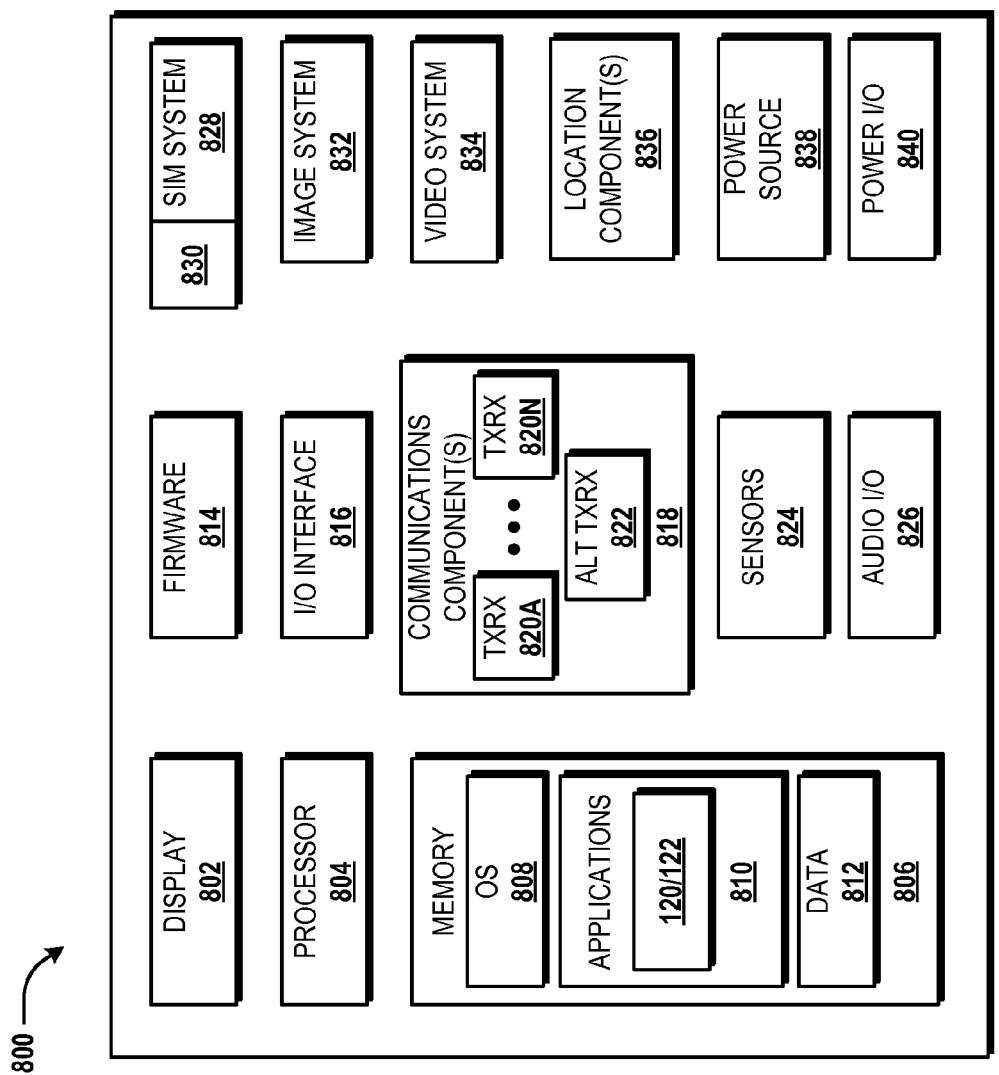
FIG. 8 is a block diagram illustrating an example mobile device capable of implementing aspects of the embodiments disclosed herein.

Turning now to FIG. 8, an illustrative mobile device 800 and components thereof will be described. In some embodiments, the mobile device 102 described above with reference to FIG. 1 can be configured as and/or can have an architecture similar or identical to the mobile device 800 described herein in FIG. 8. It should be understood, however, that the mobile device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808 (e.g., the operating system 118), one or more applications 810 (e.g., the network connection manager 120 and/or the network decision engine 122), other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the cell broadcast message 104, the local signaling load information 106, the signaling load information 112, the signaling load query 406, and/or the signaling load response 412. According to various embodiments, the applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 900 described above herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, IRDA, NFC, other RF technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, A-GPS devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
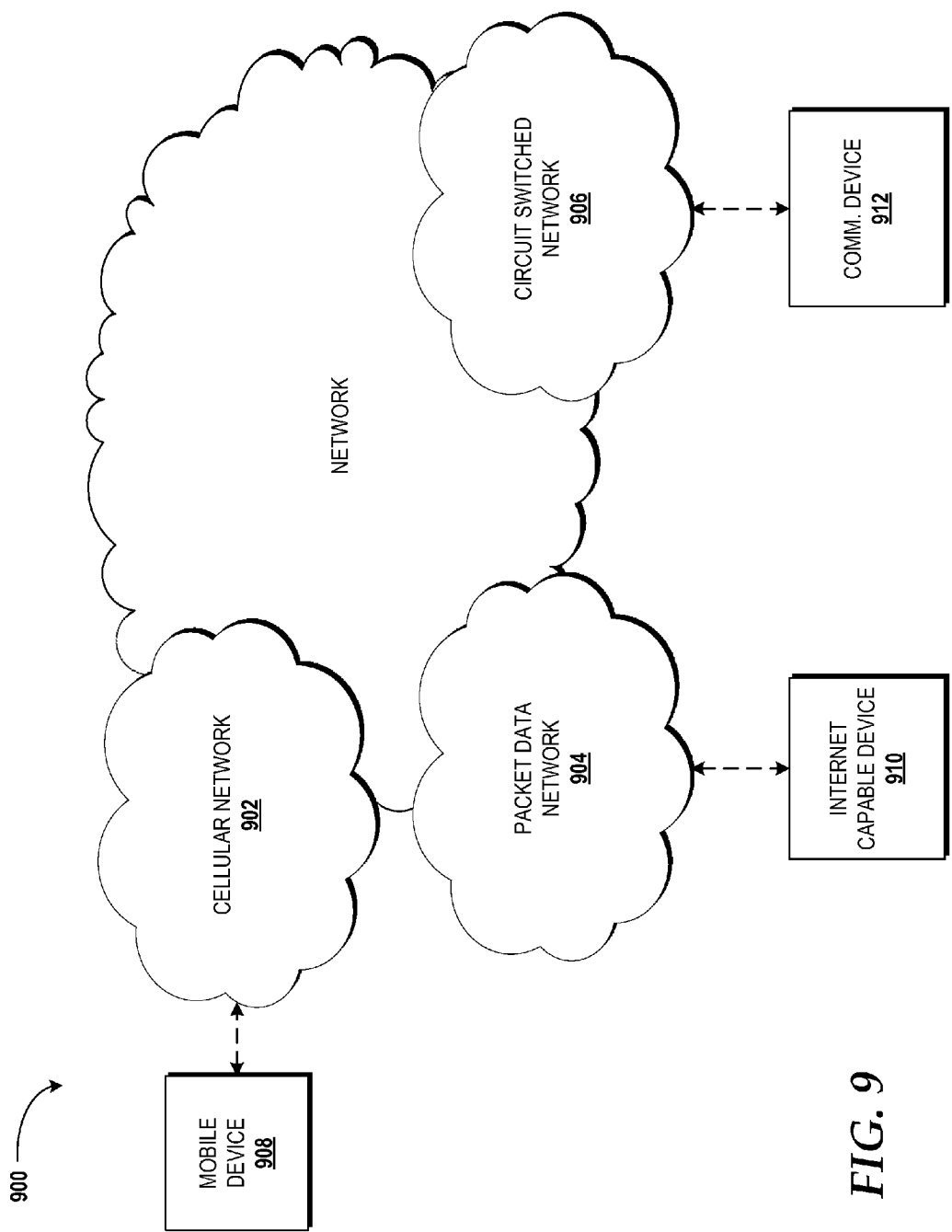
FIG. 9 is schematically illustrates a network, according to an illustrative embodiment.

Turning now to FIG. 9, additional details of a network 900 are illustrated, according to an illustrative embodiment. The network 900 includes a cellular network 902, a packet data network 904, for example, the Internet, and a circuit switched network 906, for example, a publicly switched telephone network ("PSTN"). The cellular network 902 includes various components such as, but not limited to, BTSs, Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906. In some embodiments, the cellular network 902 includes one or more of the other base stations 114A-114N, the RAN 402, the SIB-incompatible base station 404, the network signaling load management system 408, and/or the signaling load information database 410.

A mobile communications device 908, such as, for example, a cellular telephone, a user equipment, a mobile terminal, a PDA, a laptop computer, a hand-held computer, the mobile device 102, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 includes various devices, for example, servers, computers, databases, and other devices in communication with another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system (POTS). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, the mobile device 102, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, the user device 102, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 900 is used to refer broadly to any combination of the networks 902, 904, 906. It should be appreciated that substantially all of the functionality described with reference to the network 900 can be performed by the cellular network 902, the packet data network 904, and/or the circuit switched network 906, alone or in combination with other networks, network elements, and the like.

Based on the foregoing, it should be appreciated that concepts and technologies directed to cell broadcast for signaling resource load from RANs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   collecting, by a base station, signaling load information of the base station, wherein the signaling load information is representative of a signaling load associated with the base station;
   generating, by the base station, a cell broadcast message comprising the signaling load information; and
   sending, by the base station, the cell broadcast message to a target mobile device that determines, based at least in part upon the signaling load information, to which radio access network of a plurality of radio access networks to connect.

2. The method of claim 1, wherein the cell broadcast message comprises a system information block.

3. The method of claim 1, wherein the cell broadcast message comprises a short messaging service message.

4. The method of claim 1, further comprising calculating, by the base station, a composite signaling load level condition of the base station based upon the signaling load information.

5. The method of claim 1, further comprising learning, by the base station, further signaling load information of a neighbor base station, wherein the further signaling load information is representative of a further signaling load associated with the neighbor base station; and wherein generating, by the base station, the cell broadcast message comprises generating, by the base station, the cell broadcast message further comprising the further signaling load information.

6. The method of claim 5, wherein learning the further signaling load information of the neighbor base station comprises learning the further signaling load information of the neighbor base station via a self-optimizing network feature.

7. The method of claim 1, further comprising learning, by the base station, further signaling load information of an overlapping cell associated with a different radio access technology from a radio access technology utilized by the base station, and wherein generating, by the base station, the cell broadcast message comprises generating, by the base station, the cell broadcast message further comprising the further signaling load information of the overlapping cell.

8. The method of claim 1, further comprising learning, by the base station, further signaling load information of an overlapping cell associated with a different frequency from a frequency utilized by the base station, and wherein generating, by the base station, the cell broadcast message comprises generating, by the base station, the cell broadcast message further comprising the further signaling load information of the overlapping cell.

9. The method of claim 1, further comprising sending, by the base station, the signaling load information to a network signaling load management server configured to provide the signaling load information to the target mobile device in response to a signaling load query received from the target mobile device.

10. A base station comprising:
    a processor; and
    a memory comprising computer-executable instructions that, when executed by the processor, cause the base station to perform operations comprising:
       collecting signaling load information of the base station, wherein the signaling load information is representative of a signaling load associated with the base station,
       generating a cell broadcast message comprising the signaling load information, and
       sending the cell broadcast message to a target mobile device that determines, based at least in part upon the signaling load information, to which radio access network of a plurality of radio access networks to connect.

11. The base station of claim 10, wherein the cell broadcast message comprises a system information block.

12. The base station of claim 10, wherein the cell broadcast message comprises a short messaging service message.

13. The base station of claim 10, wherein the cell broadcast message further comprises a priority order in which the target mobile device should select the plurality of radio access networks.

14. The base station of claim 10, wherein the operations further comprise learning further signaling load information of an overlapping cell associated with a different radio access technology from a radio access technology utilized by the base station, and wherein generating the cell broadcast message comprises generating the cell broadcast message further comprising the further signaling load information of the overlapping cell.

15. The base station of claim 10, wherein the operations further comprise learning further signaling load information of an overlapping cell associated with a different frequency from a frequency utilized by the base station, and wherein generating the cell broadcast message comprises generating the cell broadcast message further comprising the further signaling load information of the overlapping cell.

16. A computer storage medium comprising computer-executable instructions that, when executed by a processor of a base station, cause the base station to perform operations comprising:

collecting signaling load information of the base station, wherein the signaling load information is representative of a signaling load associated with the base station;

generating a cell broadcast message comprising the signaling load information; and sending the cell broadcast message to a target mobile device that determines, based at least in part upon the signaling load information, to which radio access network of a plurality of radio access networks to connect.

17. The computer storage medium of claim 16, wherein the cell broadcast message comprises a system information block.

18. The computer storage medium of claim 16, wherein the cell broadcast message comprises a short messaging service message.

19. The computer storage medium of claim 16, wherein the operations further comprise learning further signaling load information of an overlapping cell associated with a different radio access technology from a radio access technology utilized by the base station, and wherein generating the cell broadcast message comprises generating the cell broadcast message further comprising the further signaling load information of the overlapping cell.

20. The computer storage medium of claim 16, wherein the operations further comprise learning further signaling load information of an overlapping cell associated with a different frequency from a frequency utilized by the base station, and wherein generating the cell broadcast message comprises generating the cell broadcast message further comprising the further signaling load information of the overlapping cell.

* * * * *